United States Patent [19]

Lambert

[11] Patent Number: 5,135,642

[45] Date of Patent: * Aug. 4, 1992

[54] HYDROCARBON CONVERSION PROCESSES USING NOVEL CRYSTALLINE SILICON ENHANCED ALUMINAS

[75] Inventor: Susan L. Lambert, Rolling Meadows, Ill.

[73] Assignee: UOP, Des Plaines, Ill.

[*] Notice: The portion of the term of this patent subsequent to Jan. 14, 2009 has been disclaimed.

[21] Appl. No.: 656,927

[22] Filed: Feb. 19, 1991

Related U.S. Application Data

[63] Continuation-in-part of Ser. No. 404,550, Sep. 7, 1989, Pat. No. 5,008,233.

[51] Int. Cl.$^5$ .................. C10G 11/02; C10G 47/02
[52] U.S. Cl. ............................ 208/120; 208/111; 208/133; 208/115; 208/116; 585/462; 585/463; 585/467
[58] Field of Search ............. 208/120, 133, 115, 116; 585/462, 463, 467

[56] References Cited

U.S. PATENT DOCUMENTS

| | | | |
|---|---|---|---|
| 2,620,314 | 12/1952 | Hoekstra | 252/448 |
| 4,310,440 | 1/1982 | Wilson et al. | 252/435 |
| 4,422,959 | 12/1983 | Lawson et al. | 502/247 |
| 4,440,871 | 4/1984 | Lok et al. | 502/214 |
| 4,503,023 | 3/1985 | Breck et al. | 423/328 |
| 4,576,711 | 3/1986 | Ward et al. | 208/111 |
| 4,597,956 | 7/1986 | Hinchey et al. | 423/328 |
| 4,610,856 | 9/1986 | Skeels et al. | 423/328 |
| 4,711,770 | 12/1987 | Skeels et al. | 423/328 |
| 4,753,910 | 6/1988 | Han et al. | 502/85 |
| 4,758,330 | 7/1988 | Kidd | 208/213 |
| 4,806,513 | 2/1989 | McDaniel et al. | 502/107 |
| 4,870,222 | 9/1989 | Bakas et al. | 585/323 |

OTHER PUBLICATIONS

"Zeolite Chemistry V-Substitution of Silicon for Aluminum in Zeolites via Reaction with Aqueous Fluorosilicate" published at p. 87 of *Proceedings of 6th International Zeolite Conference, 1983*, edited by David Olson; Butterworth, Guildford, U.K.

"Faujasites Dealuminated with Ammonium Hexafluorosilicate; Variables Affecting the Method of Preparation" by G. Garralon et al., at p. 268 of *Zeolites*, vol. 8, Jul. 1988.

Merck Index, 11th Edition, (1989) published by Merck & Co., Rahway, N.J., U.S.A.

*Primary Examiner*—Helane Myers
*Attorney, Agent, or Firm*—Thomas K. McBride; Eugene I. Snyder; Frank S. Molinaro

[57] ABSTRACT

This invention relates to novel silicon enhanced aluminas (SEAL), processes to prepare them, and hydrocarbon conversion processes using the SEALs. The SEAL compositions have a bulk empirical formula of $Al_{2-x}Si_xO_3F_x$ where x varies from about 0.01 to about 0.5. This SEAL material has a three-dimensional pore structure with the pores having diameters in the range of about 20 to about 300Å, a crystal structure characteristic of alumina, and where the surface of the SEAL has a higher silicon concentration than the interior of the SEAL. The SEAL is prepared by contacting an alumina with a fluorosilicate salt. This SEAL can be calcined to give a calcined seal with a formula $Al_{2-x}Si_xO_3F_y$ where x is as defined above and y varies from 0.01 to x. The calcined SEAL contains both strong and weak acid sites. These SEAL compositions are particularly useful in hydrocracking, cracking and alkylation processes.

12 Claims, No Drawings

HYDROCARBON CONVERSION PROCESSES USING NOVEL CRYSTALLINE SILICON ENHANCED ALUMINAS

CROSS REFERENCE TO RELATED APPLICATION

This application is a continuation-in-part of out copending application Ser. No. 07/404,550 filed on Sep. 7, 1989 now U.S. Pat. No. 5,008,233.

BACKGROUND OF THE INVENTION

Alumina is a well known catalyst support and a catalyst. It is also well known that the properties of alumina can be modified in various ways such as by cogelling with silica to form a silica-alumina. For example, U.S. Pat. No. 4,758,330 discloses a silica-alumina support prepared by forming a hydrogel of alumina and adding to the hydrogel an alkali metal silicate. Additionally, U.S. Pat. No. 4,806,513 discloses preparing an alumina with a surface coating of silica and further treated with fluorine.

In contrast to this art, applicants have prepared a composition in which some of the aluminum atoms have been removed from the alumina lattice and silicon atoms have been added to the composition. Applicants have also found that the silicon can be incorporated into the alumina framework. It has additionally been found that the basic structure of the starting alumina is maintained in the silicon enhanced alumina (hereinafter SEAL). Finally the SEAL composition also contains fluorine.

The SEAL compositions of this invention are prepared by contacting an alumina with a fluorosilicate salt at reaction conditions to remove some of the aluminum atoms and enhance the alumina with silicon. Although the prior art discloses the use of fluorosilicate salts, it is in regard to treating zeolites. Thus, U.S. Pat. No. 4,576,711 discloses contacting a Y-zeolite with an aqueous solution of ammonium hexafluorosilicate. Similarly, U.S. Pat. No. 4,503,023 also discloses dealumination of zeolites, in this case LZ-210. Other relevant prior art includes:

U.S. Pat. No. 4,753,910 which discloses using a water soluble fluoride during or after the aluminum removal step in order to solubilize the aluminum fluoride which is produced during the aluminum removal (dealumination step).

U.S. Pat. No. 4,711,770 discloses inserting silicon atoms into the crystal lattice of an aluminosilicate zeolite by contacting the zeolite with a fluorosilicate salt at a pH of about 3 to 7 and at a rate to preserve at least 60% of the crystallinity of the zeolite. This patent also discloses materials which have defect sites in the framework.

U.S. Pat. No. 4,597,956 discloses a method of removing aluminum fluoride byproducts by contacting the aluminosilicate with a soluble aluminum compound such as aluminum sulfate.

There is no mention in any of these references that one could prepare a crystalline SEAL composition by treatment of a crystalline alumina with a fluorosilicate salt. Applicants are the first to have synthesized such a novel composition. The SEAL compositions are useful as catalysts in various hydrocarbon conversion processes.

SUMMARY OF THE INVENTION

This invention relates to hydrocarbon conversion processes using a crystalline silicon enhanced alumina (SEAL). Accordingly, one embodiment of this invention is a hydrocarbon conversion process comprising contacting a hydrocarbon under hydrocarbon conversion conditions with a catalyst to give a hydroconverted product, the catalyst consisting essentially of a non-homogeneous crystalline silicon enhanced alumina (SEAL) having a bulk empirical formula of $Al_{2-x}Si_xO_3F_x$ where x varies from about 0.01 to about 0.5, the SEAL characterized in that it has a three-dimensional pore structure with the pores having diameters in the range of about 20 to about 300 Å, has a crystal structure characteristic of alumina and where the surface of the SEAL has a higher concentration of silicon than the interior of the SEAL.

Another embodiment of this invention is a hydrocarbon conversion process comprising contacting a hydrocarbon under hydrocarbon conversion conditions with a catalyst to give a hydroconverted product, the catalyst consisting essentially of a non-homogeneous crystalline silicon enhanced alumina (SEAL) having a bulk empirical formula of $Al_{2-x}Si_xO_3F_y$ where x varies from about 0.01 to about 0.5, y varies from about 0.01 to about x, the SEAL characterized in that it has both strong and weak acid sites, has a crystal structure characteristic of alumina, has a three-dimensional pore structure with pores having diameters in the range of about 20 to about 300 Å, and where the surface of the SEAL has a higher concentration of silicon than the interior of the SEAL.

Other objects and embodiments will become more apparent after a more detailed description of the invention.

DETAILED DESCRIPTION OF THE INVENTION

As stated, this invention relates to hydrocarbon conversion processes using crystalline silicon enhanced aluminas (SEALs). The alumina which constitutes the starting material may be any of the aluminas well known in the art such as boehmite, pseudoboehmite, gamma alumina, delta alumina, theta alumina and alpha alumina.

The starting aluminas which are treated to produce the subject crystalline SEAL may be in the form of a powder, sphere, extrudate, irregularly shaped particles, pills, etc. For ease of solids handling, it is preferred to treat formed or shaped supports such as pellets, spheres, extrudates, rings, irregularly shaped particles, etc. rather than powders. A particularly preferred shape is a small diameter sphere. These may be produced by the well known oil-drop method which comprises forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatment in oil and an ammoniacal solution to further improve their physical characteristics. The resulting aged and gelled particles are then washed and dried at a relatively low temperature of about 200° to about 300°

F. (93°-149° C.) and subjected to a calcination procedure at a temperature of about 850° to about 1300° F. for a period of about 1 to about 20 hours. This treatment effects conversion of the alumina hydrogel to the corresponding crystalline gamma-alumina. Preferred carrier materials have an apparent bulk density of about 0.3 to about 0.7 g/cc and surface area characteristics such that the average pore diameter is between about 20 and 300 Angstroms, the pore volume is about 0.1 to about 1 cc/g. Specific details regarding the oil-drop method may be found in U.S. Pat. No. 2,620,314 which is incorporated by reference.

The SEAL composition can be prepared by using the same general conditions and aqueous solutions used to remove aluminum and insert so-called "extraneous" silicon into zeolites. These conditions are set forth in U.S. Pat. Nos. 4,597,956; 4,711,770 and 4,753,910. Other references which address silicon substitution in zeolites are "Zeolite Chemistry V-Substitution of Silicon for Aluminum in Zeolites via Reaction with Aqueous Fluorosilicate" published at page 87 of *Proceedings of 6th International Zeolite Conference*, 1983, edited by David Olson; Butterworth, Guildford, U.K.; "Faujasites Dealuminated with Ammonium Hexafluorosilicate: Variables Affecting the Method of Preparation" by G. Garralon et al. appearing at page 268 of *Zeolites*, Vol. 8, July 1988; and U.S. Pat. No. 4,610,856. All these references are incorporated by reference for their teaching of methods of silicon insertion, which may be adapted to the instant case of a crystalline alumina.

Accordingly, the process involves contacting the crystalline alumina with an aqueous solution of a fluorosilicate salt and preferably ammonium hexafluorosilicate. The contacting is carried out at a temperature of about 10°-125° C. and preferably 20° to 95° C., with sufficient pressure to maintain liquid phase conditions. The pH of the solution should be in the range of about 3 to about 7 and preferably from about 5 to about 7. The amount of ammonium hexafluorosilicate (AFS) which is added can vary considerably, but usually the ratio of AFS:alumina is in the range of about 5 to about 95 weight percent and preferably from about 5 to about 35 weight percent. Typically the reaction is carried out by adding the solution of ammonium hexafluorosilicate to a slurry of the alumina to be treated. The addition can be carried out incrementally or continuously at a slow rate over a period of 30 minutes to 8 hours but preferably over a period of about 30 minutes to 120 minutes. After the silicate solution has been added, the resultant mixture is stirred for an additional amount of time ranging from about 1 to about 4 hours and preferably from about 1 to about 2 hours. The resultant mixture is composed of the SEAL material, an insoluble by-product powder and a liquid phase. When the starting alumina is in the form of a shaped support such as spheres, the SEAL material can be separated from the insoluble by-product powder by ordinary physical means. However, when the starting alumina is in the form of a powder or small particulates, it is difficult to physically separate the desired product from the undesirable by-product. In this case, the combined solids are washed with a soluble aluminum salt, preferably aluminum sulfate which solubilizes the by-product powder (which is primarily $NH_4AlF_4$). After the SEAL product is isolated, it is washed with water at a temperature of about 25° to about 50° C. and then dried at a temperature of about 100° to about 120° C. for a time of about 4 to about 24 hours.

The reaction which takes place during the process is described by the following chemical equation.

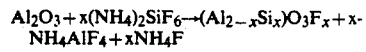

The value of x can range from about 0.01 to about 0.5. Chemical analysis shows that both silicon and fluorine are present in the alumina such that the alumina is enhanced with silicon. To determine the distribution of silicon, a sphere sample was cut in half and the cross-section analyzed by scanning electron microscopy (SEM). The analysis showed that the silicon is concentrated in the outer one-fifth of the sphere. The distribution of the fluorine could not be detected using SEM. Separate samples were also analyzed by nuclear magnetic resonance (NMR). The fluorine NMR spectra are indicative of fluorine associated with silicon, while the silicon NMR spectra are indicative of incompletely polymerized silica.

It should also be pointed out that not all of the silicon which is present in the reaction mixture is incorporated into the alumina. Analytical results indicate that about 50 weight percent of the silicon added as ammonium hexafluorosilicate is incorporated into the SEAL composition. A complete mass balance of the reaction has shown that the majority of the fluoride ions are found in the fines as $NH_4AlF_4$ (when formed supports are used) and the reaction liquid as $NH_4F$, with a small quantity of fluoride ions associated with the SEAL product. The amount of fluoride ions present in the SEAL is sufficient to charge balance all the silicon present in the SEAL. Ammonium fluoride is also present in the SEAL.

The SEAL described above can be calcined at a temperature of about 400° to about 800° C. to give a SEAL with an empirical formula of $(Al_{2-x}Si_x)O_3F_y$ where x is as defined above and y ranges from 0.01 to x. The SEAL that has been calcined is characterized in that it has less fluoride present in the structure than the uncalcined SEAL. Samples of calcined SEAL (calcined at 500° C.) compositions were analyzed by ESCA (electron spectroscopy for chemical analysis). Both whole spheres and portions of ground up spheres were analyzed. Since ESCA is a surface sensitive measurement, differences in the concentration of an element between the whole sphere and the ground sample are indicative of nonuniform distribution of the element. One sample analyzed by this technique showed that the silicon concentration on the surface of the whole sphere was about 1.6 times higher than the concentration in the ground sample. This means that the surface of the sphere has a higher silicon concentration than the interior of the sphere. In the case of fluorine the surface of the whole sphere contained 1.3 times more fluorine than the ground sample indicative of a more uniform fluorine distribution. Although these analyses were performed on a calcined sample, there is no indication that the silicon distribution is any different in the dried but uncalcined material.

Without wishing to be bound by any one theory, one can propose the following based on the above physical characterization. At the surface of the particle, e.g., sphere, there is sufficient fluorine to charge balance all the silicon (F/Si atomic ratio is about 1.2). The remaining fluorine is probably associated with the ammonium ions which are probably more uniformly distributed throughout a particle or sphere.

Calcination of the SEAL compositions affects the ammonium and fluoride content of the SEAL. The amount of ammonium ions detected in the SEAL composition decreases significantly such that at 800° C. the mass percent of nitrogen is less than 0.1%. The fluorine content also decreases as the calcination temperature is increased.

The calcined SEAL is also characterized by its acidity. Acidity of an oxide can be measured by several known methods. In the present case acidity was measured by ammonia temperature programmed desorption ($NH_3$-TPD) and conversion of 1-heptene. The greater the ability of a material to crack the 1-heptene, the greater the acidity of the catalyst. Accordingly, a SEAL composition calcined at about 400° C. has been found to have a much higher cracking ability than the starting alumina or an amorphous silica-alumina material. It is also observed that calcining the SEAL composition of this invention at about 800° C. decreases the cracking ability of the SEAL.

The $NH_3$-TPD test of a SEAL material calcined at about 400° C. shows the presence of weak acid sites and a number of very strong acid sites which do not release ammonia until greater than 600° C. In contrast, gamma alumina only shows weak acid sites as evidenced by release of ammonia at temperatures less than 400° C. Consistent with the 1-heptene test the $NH_3$-TPD of a SEAL sample calcined at 800° C. shows a reduction in the number of both strong and weak acid sites. Accordingly, it is preferred to calcine the SEAL at a temperature of about 400° C. to about 600° C.

The NMR of the calcined SEAL also shows differences from the dried SEAL. A SEAL composition which was calcined at about 400° C. showed a silicon NMR spectrum resembling that of silica, while an 800° C. calcined SEAL composition showed a spectrum consistent with either depolymerization of silicon or silicon in a more aluminum rich environment. Finally, infrared spectroscopy (IR) data of an 800° C. calcined SEAL composition is consistent with the premise that the silicon has been incorporated into the alumina lattice.

To further characterize the active species of the SEAL composition, the effect of fluorine on alumina was determined. It was determined that the addition of fluorine to an amorphous silica-alumina support did increase the cracking ability of the support but nowhere near the activity of the calcined SEAL compositions. Again, without wishing to be bound by any single theory, it appears that the active site of the SEAL composition is a silicon-fluorine species partially attached or incorporated into the alumina lattice.

The SEAL materials are also characterized in that they have the same crystal structure and pore structure as the starting aluminas. The starting aluminas have a three-dimensional pore structure with the pores having diameters in the range of about 20 to about 300 Å. The fact that the SEAL material has retained the crystal structure of the starting alumina clearly shows that the characteristic alumina structure has not collapsed and accordingly the pore structure of the alumina has remained intact. This is important because if the pore structure collapses reactants would not be able to diffuse through the SEAL.

The SEAL materials of this invention find application as hydrocarbon conversion catalysts either as is or after dispersion of catalytic metals thereon. Hydrocarbon conversion processes are well known in the art and include cracking, hydrocracking, alkylation of both aromatics and isoparaffins, isomerization, polymerization, reforming, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are well known in the art. For example, U.S. Pat. Nos. 4,310,440 and 4,440,871 disclose the conditions for the above-named processes and are incorporated by reference. Of the processes enumerated above, the SEAL materials are particularly suited for hydrocracking, cracking, and alkylation (especially aromatic alkylation).

Hydrocracking conditions typically include a temperature in the range of 400° to 1200° F. (204°–649° C.), preferably between 600° and 950° F. (316°–510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178–8,888 std. $m^3/m^3$), preferably between 2,000 and 30,000 scf per barrel of charge (355–5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with SEAL compositions using feedstocks such as gas oils, heavy naphthas, deasphalted crude oil residua, etc. with gasoline being the principal desired product. Temperature conditions of 850° to 1100° F., LHSV values of 0.5 to 10 and pressure conditions of from about 0 to 50 psig are suitable.

Alkylation of aromatics usually involves reacting an aromatic ($C_6$ to $C_{12}$), especially benzene, with a monoolefin to produce a linear alkyl substituted aromatic. The process is carried out at an aromatic: olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig. Further details on apparatus may be found in U.S. Pat. No. 4,870,222 which is incorporated by reference.

The SEAL materials of this invention may have dispersed thereon catalytic metals well known in the art and may be prepared according to the procedure in U.S. Pat. No. 4,422,959 which is incorporated herein by reference. Specifically, one or more metal selected from the group consisting of metals of Group VIII and Group VI-B of the periodic table as shown on the inside cover of the Merck Index, 11th Edition, (1989) published by Merck & Co., Rahway, N.J., U.S.A. The SEAL materials may also be combined with zeolites, clays, etc. in order to prepare a hydrocracking catalyst.

The following examples are presented in illustration of this invention and are not intended as undue limitations on the generally broad scope of the invention as set out in the appended claims.

EXAMPLE 1

Heptene Cracking Test

The following test procedure was used to evaluate the materials prepared in Examples 2-5. The heptene cracking test or the microreactor cracking test uses an electrically heated reactor which is loaded with 125 mg of 40-60 mesh (420-250 microns) particles of the catalyst to be tested. Each catalyst was dried in situ for 30 minutes at 200° C. using flowing hydrogen, and then subjected to a reduction treatment of 550° C. in flowing hydrogen for one hour. The temperature of the reactor was then adjusted to 425° C. (inlet). The feed stream used to test the catalyst consists of hydrogen gas which is saturated with 1-heptene at 0° C. and atmospheric pressure. The feed stream was flowed over the catalyst at a flow rate of 500 cc/min. The effluent gas stream was analyzed using a gas chromatograph. What is reported in the examples that follow is weight percent cracked product and selectivity for $C_3+C_4$.

EXAMPLE 2

A sample of 1/16" spheres of gamma-alumina prepared according to the procedure in U.S. Pat. No. 2,620,314 was ground to pass through a 40 mesh screen (420 micron). One hundred grams of this material was slurried in 1000 g deionized water and heated to 97° C. A separate solution of 35.4 g of ammonium hexafluorosilicate dissolved in 200 g deionized water was then added dropwise to the alumina slurry. This addition required 50 minutes during which time the reaction mixture had a temperature in the range of 83°-91° C. After the addition was complete the reaction mixture was digested at 90° C. for one hour. The solids were separated from the reaction mixture by filtration and then washed with one liter of 0.2M aluminum sulfate solution at 50° C. This was followed by 400 mL deionized water, also at 50° C. The solids were dried at 100° C. yielding 107.9 g of material. The dried sample contained 2.86 mass percent F(as received (AR)), 0.725 mass percent N(AR) and 4.97 mass percent Si(AR). It had a loss on ignition (LOI) at 900° C. of 12.74%. A portion of this dried sample was calcined in air at 500° C. for 5 hours in a muffle oven. After calcination the sample contained 2.47 mass percent F(AR), 0.36 mass percent N(AR) and 5.27 mass percent Si(AR). The mass percent reported is on an as received (AR) basis since calcination of the sample to remove all volatiles would remove the fluorine and nitrogen. The calcined sample had an LOI at 900° C. of 2.14%. The x-ray diffraction pattern of this material showed gamma-alumina as the only crystalline phase. The calcined sample was tested in the 1-heptene microreactor test described in Example 1. This material showed 66 weight percent cracking, with 95% selectivity to $C_3+C_4$ products.

EXAMPLE 3

A 250 mg sample of gamma-alumina obtained by grinding 1/16" spheres as per Example 2 was tested according to the procedure set forth in Example 1 with the exception that the flow rate of feed gas was 1000 cc/min. instead of 500 cc/min. This is equivalent to testing 125 mg of catalyst at a feed rate of 500 cc/min. Analysis of this alumina showed that no silicon or fluorine was present. This sample cracked only 0.34 weight percent of the feed and the selectivity for $C_3+C_4$ products was only 40%.

EXAMPLE 4

A sample of 1/16" spheres of gamma-alumina prepared as per U.S. Pat. No. 2,620,314 was treated with ammonium hexafluorosilicate in this example. The use of the spherical form of the alumina facilitates separation of the product from the fines. Spherical gamma-alumina, 110 g, was slurried in 1000 g deionized water and heated to 62° C. A solution of 70.0 g ammonium hexafluorosilicate in 400 g deionized water was added dropwise to the alumina slurry over the course of 6 hours. The reaction temperature reached 84° C. after the first hour and was maintained in the 82°-84° C. range for the rest of the addition. After addition of the ammonium hexafluorosilicate was completed, the mixture was digested for one hour at 83° C. before the liquid and fines were decanted. The spheres were washed with 5 liters of deionized water and dried at 100° C., yielding 135 g. The spheres were calcined at 500° C. for 5 hours in a muffle oven. The calcined material contained 4.76 mass percent Si(AR), 1.88 mass percent F(AR) and had an LOI at 900° C. of 21.46%. This material exhibited a cracking activity in the 1-heptene microreactor test of Example 1 of 34 weight percent. The $C_3+C_4$ selectivity was 95%.

EXAMPLE 5

A 110 g sample of 1/16" spheres of gamma-alumina prepared as per U.S. Pat. No. 2,620,314 was slurried in 1000 g deionized water and heated to 80°-90° C. A solution of ammonium hexafluorosilicate, 7.00 g in 200 g deionized water was added to the slurry over a 3 hour period, after which time the reaction mixture was digested for an additional 2 hours at 86° C. The spheres were separated from the reaction mixture by decantation, washed with 5.5 liters of deionized water and then dried at 100° C. Finally, dried spheres were calcined in a muffle oven for 5 hours at 500° C. The product contained 0.92 mass percent Si(AR) and 1.88 mass percent F(AR), and had an LOI at 900° C. of 8.27%. The calcined sample was tested using the procedure in Example 1 and showed a cracking conversion of 15% and a $C_3+C_4$ selectivity of 93%.

I claim as my invention:

1. A hydrocarbon conversion process comprising contacting a hydrocarbon under hydrocarbon conversion conditions with a catalyst to give a hydroconverted product, the catalyst consisting essentially of a nonhomogeneous crystalline silicon enhanced alumina (SEAL) having a bulk empirical formula of $Al_{2-x}Si_xO_3F_x$ where x varies from about 0.01 to about 0.5, the SEAL characterized in that it has a three-dimensional pore structure with the pores having diameters in the range of about 20 to about 300 Å, has a crystal structure characteristic of alumina and where the surface of the SEAL has a higher concentration of silicon than the interior of the SEAL.

2. The process of claim 1 where the hydrocarbon conversion process is hydrocracking.

3. The process of claim 1 where the hydrocarbon conversion process is cracking.

4. The process of claim 1 where the hydrocarbon conversion process is alkylation.

5. The process of claim 1 where the SEAL is in the shape of spheres.

6. The process of claim 1 where the SEAL has deposited thereon at least one metal selected from the group consisting of Group VIII and Group VI-B metals.

7. A hydrocarbon conversion process comprising contacting a hydrocarbon under hydrocarbon conversion conditions with a catalyst to give a hydroconverted product, the catalyst consisting essentially of a non-homogeneous crystalline silicon enhanced alumina (SEAL) having a bulk empirical formula of $Al_{2-x}Si_xO_3F_y$ where x varies from about 0.01 to about 0.5, y varies from about 0.01 to about x, the SEAL characterized in that it has both strong and weak acid sites, has a crystal structure characteristic of alumina, has a three-dimensional pore structure with pores having diameters in the range of about 20 to about 300 Å, and where the surface of the SEAL has a higher concentration of silicon than the interior of the SEAL.

8. The process of claim 7 where the hydrocarbon conversion process is hydrocracking.

9. The process of claim 7 where the hydrocarbon conversion process is cracking.

10. The process of claim 7 where the hydrocarbon conversion process is alkylation.

11. The process of claim 7 where the SEAL is in the shape of spheres.

12. The process of claim 7 where the SEAL has deposited thereon at least one metal selected from the group consisting of Group VIII and Group VI-B metals.

* * * * *